United States Patent [19]

Harms

[11] 3,933,606
[45] Jan. 20, 1976

[54] WATER TREATMENT PROCESS AND APPARATUS

[75] Inventor: Harry Keith Harms, Woodland Hills, Calif.

[73] Assignee: Saul Gealer, Los Angeles, Calif.

[22] Filed: Dec. 3, 1973

[21] Appl. No.: 421,225

[52] U.S. Cl. .................... 204/152; 204/149; 210/44
[51] Int. Cl.² ........................................... C02B 1/82
[58] Field of Search ............... 204/149, 152; 210/44

[56] References Cited
UNITED STATES PATENTS

| | | | |
|---|---|---|---|
| 1,219,333 | 3/1917 | Kynaston | 204/149 X |
| 3,726,780 | 4/1973 | Harnden et al. | 204/149 X |
| 3,728,245 | 4/1973 | Preis et al. | 204/149 X |
| 3,767,046 | 10/1973 | Hartkorn | 204/149 |

Primary Examiner—John H. Mack
Assistant Examiner—A. C. Prescott
Attorney, Agent, or Firm—Lyon and Lyon

[57] ABSTRACT

Disclosed herein are a process and apparatus for electrolytically removing suspended and dissolved impurities from contaminated water. By the process of the invention, contaminated water is fed to a column where it is exposed to an electrical field created between a plurality of oppositely charged perforate plates by a pulsating electrical signal. The pulsating signal causes cations to be freed from the plates and destroys bacteria and cyanide where present. The process causes a micro-floc to form which grows by a chaining process into a large, easily separable floc which adsorbs essentially all of the suspended matter in the contaminated water including soil and other particles of colloidal size, dead bacteria, and precipitated metal salts, as well as some metal ions.

15 Claims, 4 Drawing Figures

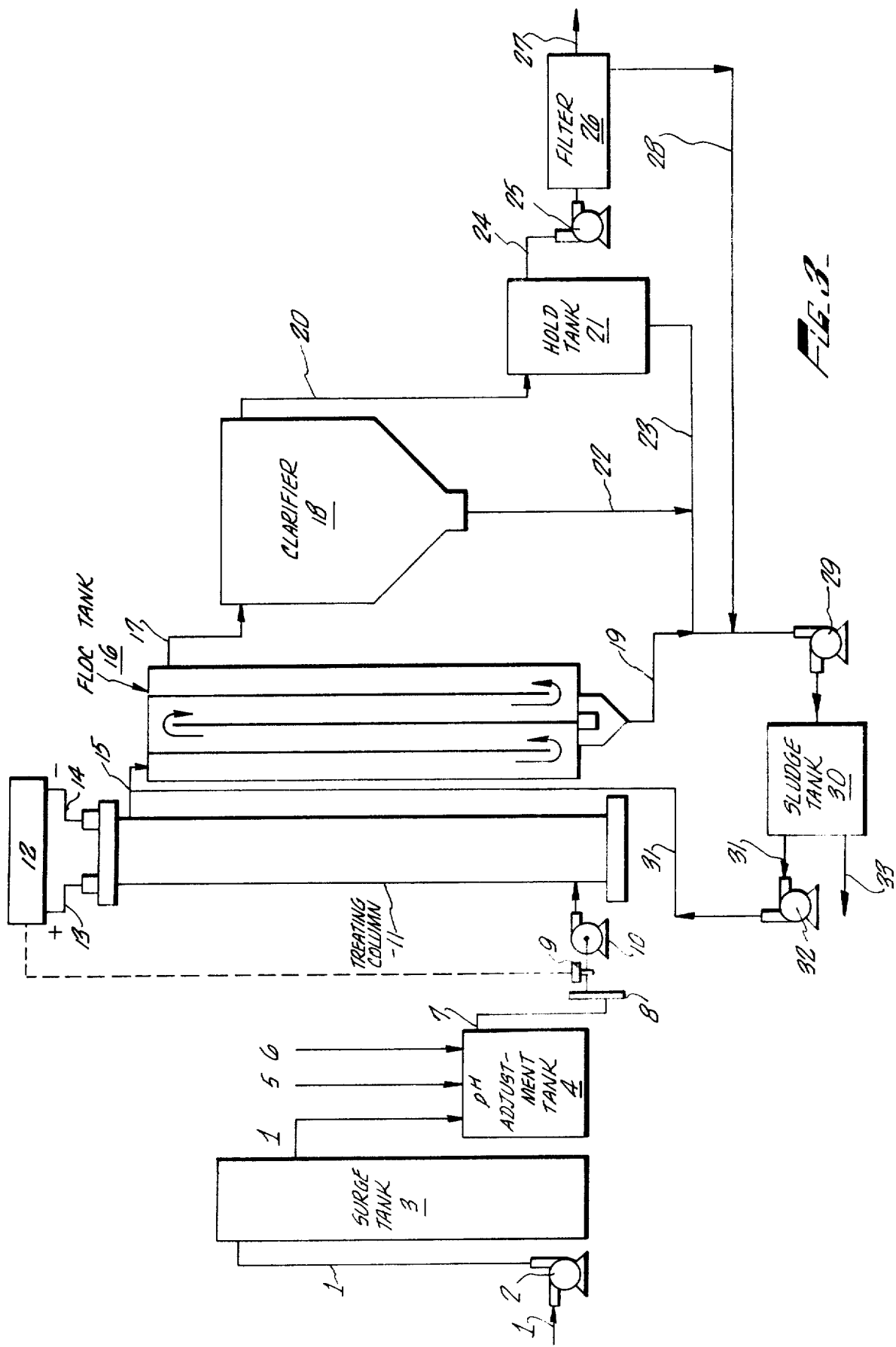

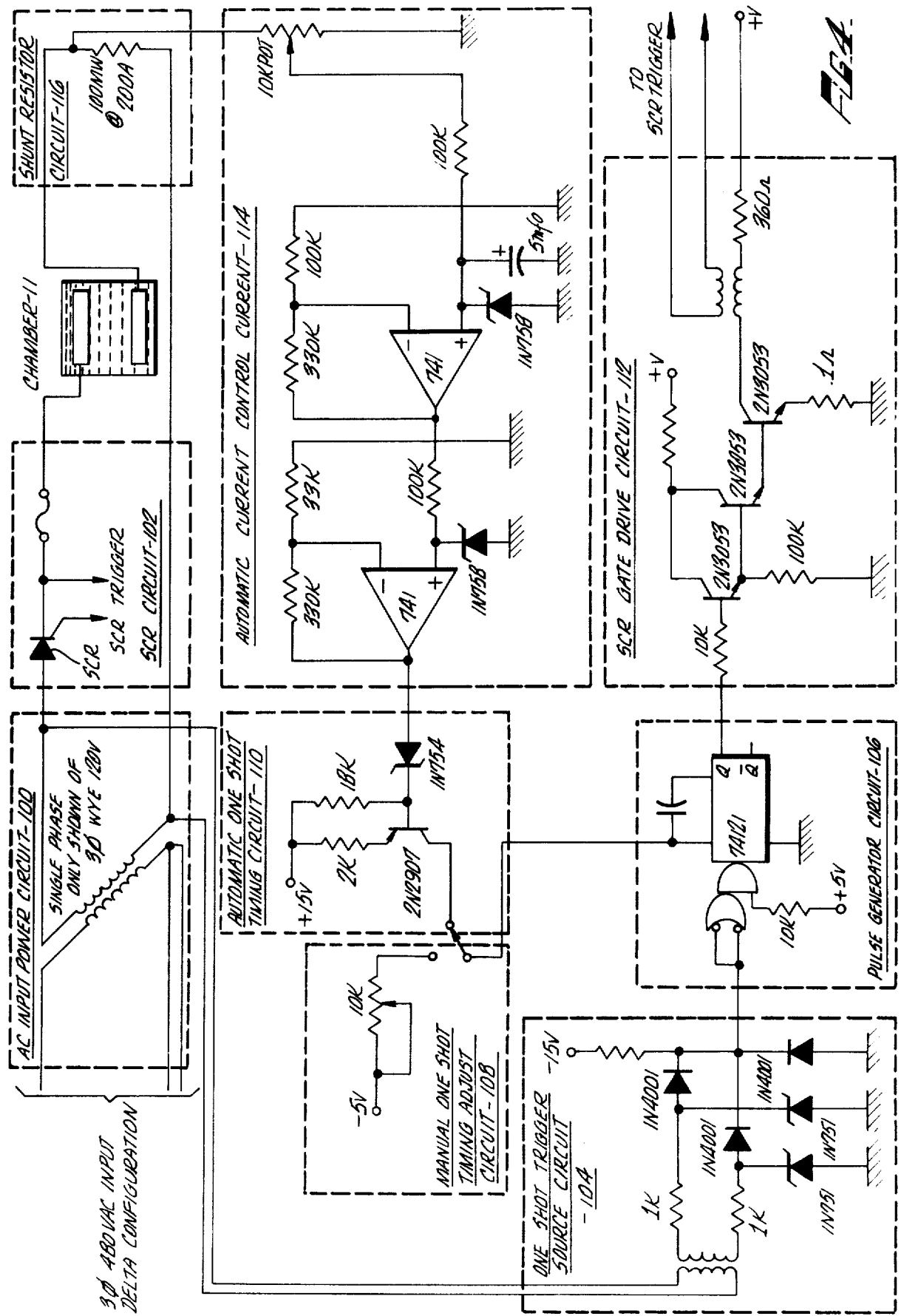

WATER TREATMENT PROCESS AND APPARATUS

BACKGROUND OF THE INVENTION

This invention relates to the field of fluid purification, and in particular, to the electrolytic treatment of contaminated water. There are many known methods of treating contaminated water to remove varying degrees of contamination therefrom. The two most common methods of water purification are chemical precipitation and reverse osmosis. It has been known to electrolytically treat polluted water to remove contaminants therefrom. For example, Landreth in U.S. Pat. No. 1,131,067 describes a liquid treatment process in which contaminated liquid is fed through a treating chamber containing multiple electrodes spaced and insulated from each other and so disposed that the liquid passes in a zigzag direction backwardly and forwardly through the chamber between the electrodes. The electrodes are alternately charged and are supplied with an electric current of unspecified nature from a generator. Similarly, U.S. Pat. No. 744,171 to Davis, et al discloses a method for separating oil and similar impurities from water by subjecting the solution to an electrolytic field of unspecified nature produced by iron electrodes which may be arranged so that the water flows past them in a zigzag manner. According to Davis, et al, the oil combines with iron freed from the electrodes to form a separable scum. More recently, Vellas, et al in U.S. Pat. No, 3,192,142 have proposed to pass contaminated water through a multiple electrode coagulation set so designed that the polluted water circulates parallel to electrodes supplied with a rectified pulsating electrical current. According to the patentees, this step has the effect of starting a process of coagulation. The oppositely charged electrodes are disclosed as fabricated from different materials, preferably rustless steel and aluminum and the current to the electrodes is selected to transmit positively charged ions to the solution. So far as I am aware, none of the methods described above have proved adaptable to large-scale treatment of contaminated water.

Other workers have commented on the importance of zeta potential in floc formation. See Thomas M. Riddick Chemical Engineering, June 26, 1961, pages 121–126 and July 10, 1961, pages 141–146. Briefly, zeta potential is a measure of the electro-kinetic charge that surrounds suspended particulate matter. Riddick describes the charges on raw water turbidity as predominately electro-negative and strong enough to cause significant mutual repulsion of the suspended particles. When the zeta potential of suspended colloidal matter is reduced to near zero, plus or minus about 5 millivolts, repulsive forces are eliminated, allowing the colloidal particles to collide with each other whereupon the forces of adhesion, cohesion and mechanical locking result in agglomeration, in turn occasioning formation of a large particle size floc which readily settles out of the solution. While Riddick controls zeta potential of colloidal matter by chemical means, applicant has found that the process and apparatus described herein apparently also has the effect of reducing the zeta potential on suspended colloidal matter so a floc can readily form which entraps virtually all of the suspended matter in the solution being treated.

SUMMARY OF THE INVENTION

In its most general sense, the apparatus of the invention comprises an upright column with a water inlet port adjacent its lower end and a water outlet port adjacent its upper end, the column containing a plurality of perforate plates disposed in the column in a plane essentially perpendicular to the longitudinal axis thereof. In some embodiments of the invention, the treating apparatus consists of a plurality of identical columns arranged in series. The traverse dimensions of the plates approximate the inside dimensions of the column to insure that, in operation, essentially all of the contaminated water entering the column passes through the perforations in the plates. The transverse dimension of individual perforations is preferably not greater than about 7% of the diameter of the plates. The perforations are preferably approximately evenly spaced across the plates, most preferably in such number as to comprise from about 20% to about 80% of the area of the plates. The plates are disposed in two sets comprised of alternating anode and cathode plates. A source of a variable pulsating electrical signal is provided to simultaneously supply the individual plates of each set with pulsating electrical signals of opposite signs. It is understood that the particular width, cross sectional shape and spacing of the plates in the column are not critical except as discussed above, these being matters of design choice.

The plates may be fabricated from a variety of conductive materials. The primary requirement is that the anode be comprised predominately of a floc forming metal such as aluminum or iron. In one embodiment, both the anode and cathode plates are fabricated from iron so even wear of the plates may be effected by reversing the sign of the signal applied to the set of plates. In another embodiment, the cathode plates may be fabricated from a non-gassing material such as molybdenum.

For each contaminated water source being used, there is an optimum current density on the plates to affect the desired contaminant removal. In practical operation, this means that for each contaminated water source, there is an optimum current which should be supplied to the column since the plates will usually be of a fixed size. Since changes in conductivity of the contaminated water may occur, which would reduce or increase the current at a constant voltage, it is desirable that the variable pulsating electrical signal source be designed with the capability of varying the voltage applied to the column in inverse relation to the conductivity to maintain a constant current. As a practical matter, pulsating electrical signal supply units with a fixed A.C. voltage supply are not capable of the range of voltage variations necessary to react to large changes in conductivity of the contaminated water. Therefore, in one embodiment of the invention, sensing means are provided for sensing conductivity and changes thereof of the contaminated water prior to its introduction to the column. The sensing means produces a signal which causes a voltage controller to vary the input A.C. voltage to the pulsating electrical signal supply unit thereby allowing the unit to react to broad changes in conductivity of the contaminated water source.

The method of generating the variable pulsating electrical signal to be applied to the plates of the column is not critical to the invention, the only requirement being that the signal creates a pulsating electrical field between the plates. In some embodiments of the invention, it is desirable that the signal develop an electrical field near the plates on the order of magnitude of at least about $10^5 - 10^6$ volts/cm. Regardless of the manner the electrical signal is generated, it is economically desirable to apply the potential between the plates only for that part of the wave form where the amplitude is relatively high since it is only at the higher amplitudes that the higher electrical fields are created.

In one embodiment of the invention, the electrical signal to the column is provided by a unit which converts an electrical alternating potential by halfwave rectification, to pulsating electrical signals of opposite signs variable in magnitude and the point on the A.C. cycle at which the potential is applied. In another embodiment, the electrical signal to the apparatus of the invention is provided by a unit which converts an electrical alternating potential by full wave rectification, to pulsating electrical signals of opposite signs variable in magnitude and the point on the A.C. cycle at which the potential is applied. The advantage of full wave rectification is that a higher frequency is obtained. The higher frequency provides twice the number of pulses provided by half wave rectification for the same power usage and therefore improved efficiency is obtained.

In yet another embodiment, an electrical A.C. signal may first be rectified by a full wave bridge and then filtered to provide a constant level D.C. voltage. The D.C. voltage may then be applied to a chopper-inverter circuit which will provide a square wave, pulsed output that is infinitely variable in frequency and width. Such a circuit provides advantages over the previously-described phase controlled methods in that the instantaneous turn on and turn off characteristic of the square wave form allows the potential to be applied only during the most efficient high amplitude portion of the wave form.

By the process of this invention, contaminated water containing any combination of organic and inorganic suspended solids of whatever particle size, dissolved metal salts and cyanide is fed to the water treatment apparatus heretofore described. Preferably, the contaminated water is pretreated prior to introduction into the apparatus by adjusting its pH to a range of from abut 8.0 to about 10.0 by addition of an aqueous acid or base such as HCl or NaOH, as required, and by screening out gross particulate matter, as by passage through a relatively large screen, as for example, a screen of about 30 mesh. It is understood that the method and apparatus of the invention are operable over the entire pH range and that pH adjustment merely functions to bring the hydroxide ion concentration to a level which present experience has demonstrated provides the most economic contaminant removal.

The contaminated water is then fed to the column where it flows through the perforations in the plates and is exposed to the pulsating electrical signal supplied to the plates. The optimal average residence time between the oppositely charged plates of the apparatus may be readily determined for each source of contaminated water being treated and depends on the degree and type of contaminant removal desired.

The application of the pulsating electrical signal to the plates as the contaminated water flows through the column causes metal salts to precipitate from the solution, bacteria to be killed, and cyanide to be destroyed, and initiates formation of micro floc. At this point, the process of of the invention in its most general sense is complete. The following post-treatment process steps serve only to aid floc formation and removal from the water.

Post-treatment of the treated water begins by feeding it to a flocculation chamber of such capacity that the average residence time of water therein is at least about 20 minutes. In the flocculation chamber, micro-floc particles grow through a chaining process and absorb from the solution metal ions as well as substantially all of the contained organic and inorganic solid particles, including dead bacteria, colloidal particles and newly precipitated metal salts. The floc is then removed by clarification and filtering apparatus to yield essentially pure water and a sludge which may be further treated to recover metals and other valuable by-products.

DESCRIPTION OF THE DRAWINGS

FIG. 3 is a schematic process flow diagram of one embodiment of the process of the invention.

FIG. 4 is a simplified schematic block diagram of a portion of an electrical circuit suitable for supplying a pulsating electrical signal to the apparatus of the invention.

DETAILED DESCRIPTION OF THE INVENTION

Figure 1:
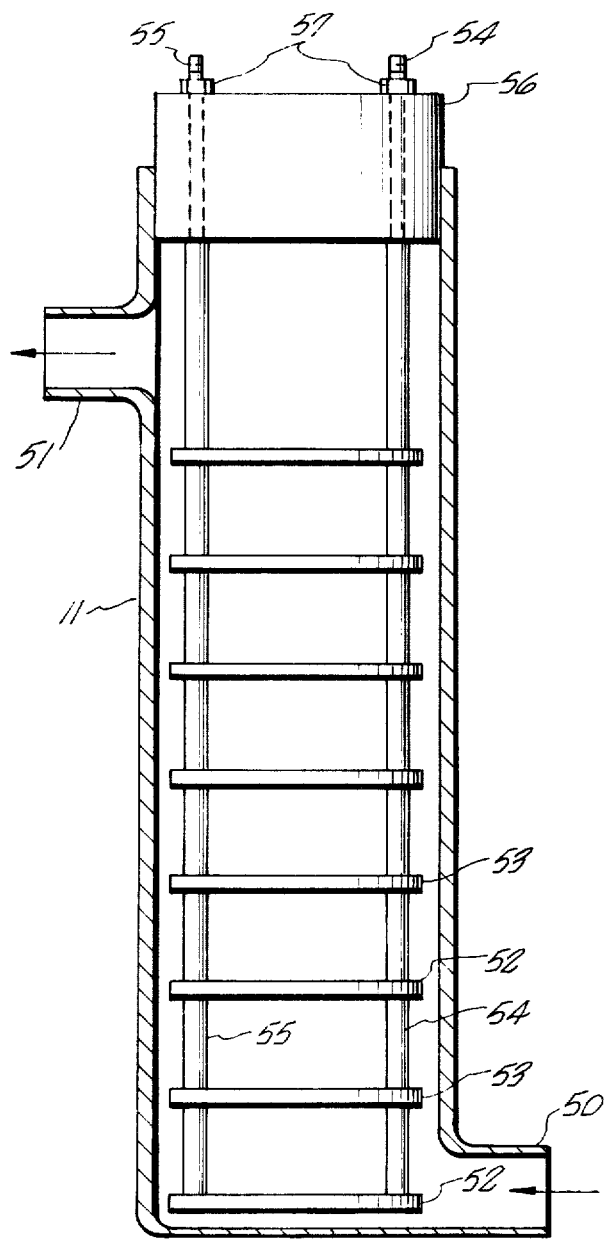
FIG. 1 is a partial cross-sectional view of one embodiment of the apparatus of the invention.

One embodiment of the apparatus of the invention is depicted in FIG. 1 and comprises an upright column 11 which may be constructed from any non-conductive material, e.g., lucite or glass. It is understood that the only requirement for construction of column 11 is that the interior of the column be non-conducting. Thus, the materials of construction may include a column of an outer conductive shell about a non-conductive lining. When the column is constructed of a transparent, non-conductive material such as lucite or glass, the additional advantage of being able to observe its operation accrues. Column 11 has water inlet port 50 and water outlet port 51. Disposed within the column in a plane essentially perpendicular to the longitudinal axis thereof are a plurality of perforate plates 52 and 53. Plates 52 and 53 are fabricated from iron and are electrically insulated from the column. Their transverse dimensions approximate the inner diameter of the column so as to insure that, in operation, essentially all of the contaminated water being treated passes through plate perforations.

In FIG. 1, numerals 52 and 53 designate two mutually alternating sets of plates disposed in the column. Cathode plates 52 are electrically connected to cathode 54 and anode plates 53 are electrically connected to anode 55. Anode 55 and cathode 54 are mounted in column 11 in any convenient manner as by being secured by nuts 57 to plug 56.

Figure 2:
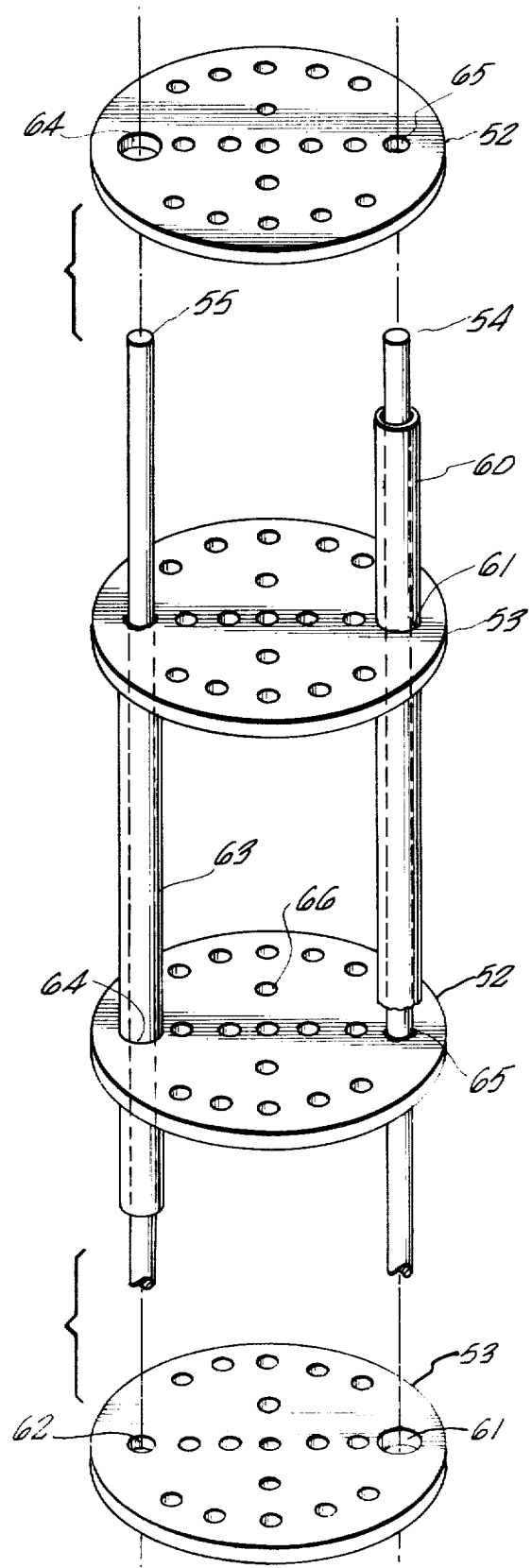
FIG. 2 is a perspective view of a portion of the apparatus of FIG. 1 showing the arrangement of the plates.

FIG. 2 more clearly depicts the arrangement of the plates. In operation, each alternating set of plates is supplied with a variable pulsating electrical signal of opposite sign. In the embodiment of the invention depicted in FIG. 2, cathode plates 52 are supplied with mounting perforations 64 and 65. The diameter of perforation 65 is approximately equal to the outside diameter of cathode rod 54 so that plate 52 may be electrically connected to cathode rod 54 at the periphery of perforation 65. The diameter of perforation 64 is slightly larger than the outside diameter of insulator 63 so that insulator 63 may be passed through plate 52 thereby electrically insulating it from anode rod 55. Anode plates 53 are provided with perforations 61 and 62. Perforation 62 is of a diameter approximately equal to the outside diameter of anode 55 so that plates 53 may be electrically connected to anode rod 55 at the periphery of perforation 62. The diameter of perforation 61 is slightly larger than the outside diameter of insulator 60 so that insulator 60 may be passed through plate 53, electrically insulating it from cathode 54. Plates 52 and 53 are provided with perforations 66 through which the water being treated flows.

In one embodiment of the invention, as represented in FIG. 2, plates 52 and 53 are identical 5½ inch diameter iron plates with ¼ inch diameter perforations set on a ½ inch staggered center which total about 40% of the area of the plates. In other embodiments of the invention, as for example when non-gassing cathode plates are employed, the cathode plates would be provided with minimum number of relatively large holes while the anode plates will have a maximum amount of small holes to increase the ratio of anode area to cathode area thereby increasing the current density on the anode.

Cathode rod 54 and anode rod 55 are supplied with pulsating electrical signals of opposite signs by variable pulsating electrical signal unit generating means 12. As was pointed out above, in some embodiments of the invention, it is desirable that the pulse provided by unit 12 develops electrical fields at the surface of the anode plate on the order of magnitude of at least $10^5 - 10^6$ volts/cm. This is desirable because it has been calculated that when a potential is applied between spaced iron plates through a conductive solution, space charge sheaths will be produced at the surface of the plates. The space charge sheaths are exceedingly thin compared to separation of the electrodes. For example, with a normal separation of electrodes in a sodium chloride solution, as for example, one inch or more, the space charge sheaths at a potential of 100 volts and a current of 1 amp or any combination totaling 100 volt-amps will be $0.376 \times 10^{-3}$ cm in thickness. The high electrical fields of $10^5 - 10^6$ volts/cm magnitude referred to above are developed in these space charge sheaths. The configuration of the apparatus of the invention insures that substantially all of the contaminated water being treated is exposed to these high-potential space charge sheaths. For convenience, the calculated potential assumed planar plates. When the irregularity of the iron surface and the edge of the perforations are taken into account, it is probable that the potential may be an order of magnitude higher at some points. The calculated potential is sufficient to remove metal ions from the surface of the anodes into the contaminated water, cause disassociation of cyanide molecules and water, and destroy bacteria in a sodium chloride solution, It is understood that the magnitude of the electrical charge in the space charge sheath necessary to affect a desired degree of contaminate removal will vary with the composition of the water being treated.

The apparatus of the invention includes means to supply the sets of plates 52 and 53 with a variable pulsating electrical signal of opposite signs. This means is generally designated as unit 12 in the process flow diagram of FIG. 3. In the embodiment of the invention where the signal is supplied by halfwave rectification as described above, the circuitry of unit 12 is as depicted by simplified block schematic diagram FIG. 4. FIG. 4 depicts in simplified form, one third of a circuit capable of providing a pulsating electrical signal to each of three columns employed in series in the process of the invention. The circuitry is repeated three times to provide a signal to each unit. In this embodiment of unit 12, input A.C. power circuit 100 is supplied with a 480 volt, three-phase electrical signal in delta configuration and the signal is transformered down to a 120 volt, three-phase wye configuration. Each phase of the 120 volt signal is applied to a silicon-controlled rectifier (SCR) in SCR circuit 102. The SCR is triggered by the control circuits 104-116 described below. When triggered, the SCR applies an electrical signal to the plates of the column. The timing of the triggering signal determines the portion of the halfwave rectified wave form applied.

The triggering circuit comprises one shot trigger source circuit 104 which maintains syncronization between SCR triggering and the input A.C. voltage. The signal developed by one shot trigger source circuit 104 is supplied to pulse generator 106 which develops a variable time based square wave pulse. Pulse timing may be adjusted either by manual one shot timing adjust circuit 108 or by automatic one shot timing circuit 110, if automatic mode is desired. The time adjusted pulse developed by pulse generator 106 is applied to SCR gate drive circuit 112 which applies the triggering signal to activate the SCR in SCR circuit 102. The current across the plates of column 11 is maintained at constant level by shunt resistor circuit 116 which supplies a signal to automatic current control circuit 114 which automatically adjusts the pulse width thereby maintaining the current to chamber 11 at a constant value. In one embodiment unit 12 may be supplied with an A.C. voltage control regulator, not shown, which adjusts the A.C. voltage supply in increments responsive to the conductivity of the contaminated water so that the current control feature of unit 12 may function over a broad conductivity range.

The process of one embodiment of the invention is depicted in schematic form in FIG. 3. Contaminated water 1 is pumped by pump 2 to surge tank 3. The contaminated water may contain as contaminants to be removed from the solution, organic and inorganic suspended solids, dissolved metal salts such as iron, lead, tin, nickel, cobalt, cadmium, chromium, zinc, aluminum, magnesium, calcium, sodium, copper, mercury, silver, gold, platinum, and antimony salts as well as cyanide complexes of these and other metals. From surge tank 3, contaminated water 1 flows to pH adjustment tank 4. If the pH of the contaminated water 1 is outside the range of from about 8.0 to about 10.0, the pH is adjusted to within that range by the addition of an aqueous acid 5, as for example, HCl or $H_2SO_4$, or an aqueous base 6, as for example, sodium or calcium hydroxide as required.

The contaminated water 7 whose pH has been adjusted to within the specified range is screened through screen filter 8 which is comprised of a screen of relatively large mesh, as for example, about 30 mesh or larger. The conductivity of contaminated water 7 is measured by conductivity sensor 9 which produces a signal from which a voltage controller adjusts the A.C. voltage supply to pulsating electrical signal unit 12 so that the unit may regulate the electrical signal supplied to the plates of the treating apparatus 11 as described above. The contaminated water 7 is then pumped by pump 10 to the water inlet port at the bottom of column 11. The water passes through the plates of column 11 and is exposed to a pulsating electrical signal supplied to the plates by unit 12 via electrical leads 13 and 14. The electrical signal destroys bacteria in the water, destroys cyanide, disassociates water to form hydroxide ions, and releases iron cations from the iron anode plates. It is believed that iron cations form compounds such as $[Fe(H_2O)_x(OH)_2]^{+++}$, etc. which polymerize and initiate the formation of a floc. In addition, the iron cations replace metal cations above iron in the electromotive series in the solution, causing the precipitation of metal salts from the water. Insoluble metal hydroxides are also formed as precipitates. Flox formation begins almost instantaneously in the form of a micro-floc which becomes visible as chaining occurs as the contaminated water passes through the plates of column 11.

For each water source being treated, there is an optimum current density on the plates, which will vary depending on the contaminants sought to be removed from the solution. This optimum current density can readily be determined for a particular solution merely by varying the current supplied to the plates of the apparatus or a pilot version thereof to achieve optimum removal of desired contaminants. The column is sized so as to economically process any desired flow rate. In operation, the total current supplied to the apparatus is automatically maintained at a constant by electrical signal unit 12 as described above. The treatment time, i.e., the residence time of the water in column 11 will vary with each contaminated water source being treated according to the nature and quantity of the contaminants sought to be removed.

The treated water 15 next flows to flocculation tank 16 which is of such size as to provide a residence time of the treated water in the tank of at least about 20 minutes. As the water passes through tank 16, it may be caused to follow a non-linear path through the tank as by the Wier design depicted in FIG. 3. The Wier design maintains the water in gentle agitation which aids in floc formation and growth. It is also believed that the column design of tank 16 aids in floc formation due to the pressures present at the bottom of the column. During this time, the micro-floc grows through chaining into large floc particles which absorb metals from the solution as well as substantially all of the solids in the treated water, including colloidal suspended solids, dead bacteria and newly precipitated metals. It is believed that one reason the floc is able to absorb the colloidal particles is that subjecting the suspended solids to the pulsating electrical signal in the treating apparatus reduces the zeta potential of the normally negatively charged colloidal particles to near neutrality, reducing the repulsive forces between the colloidal particles and allowing them to collide with each other whereupon the forces of adhesion, cohesion, and mechanical locking result in agglomeration of the particles and absorption thereof by the growing floc.

Treated water 17 containing suspended floc is removed from floc tank 16 and fed to clarifier 18. Some of the floc will settle in the floc tank and is removed from the bottom as sludge 19 which is handled as described below. Clarifier 18 is designed to aid in removal of the floc particles. In a preferred design, the clarifier may be shaped to function like a cyclone and remove most of the suspended floc. Alternatively, the clarifier may be a centrifuge or other commercially available clarifier. Clarified water 20 is fed to holding tank 21 and the floc and sludge 22 is removed from the bottom of the clarifier and treated as described below. Additional sludge and floc 23 will settle to the bottom of hold tank 21 and is removed and treated as described below. The treated water 24 from hold tank 21 is pumped by pump 25 through polish filter 26 which may be any suitable commercially available polish filter capable of removing the floc particles which have not been removed from the water. Essentially pure, treated water 27 from which all floc particles have been removed emerges from filter 26 and may be used as desired. The filter cake 28 is removed from filter 26, combined with floc and sludge 19, 22, and 23 and pumped by pump 29 to sludge tank 30. If desired, the overflow 31 from sludge tank 30 may be returned to the floc tank by pump 32. The concentrated sludge 33 may be treated as desired, e.g., to recover metals therefrom, or may be disposed of.

The apparatus and method of the invention are further disclosed and described by the following examples in which they are employed to treat the waste stream from a metal plating plant. The treating process was essentially as described in FIG. 3 except that three identical columns were connected in series and no clarifier was employed. The circuitry of unit 12 was essentially as described in FIG. 4. Each of the three circuits, only one of which is depicted in FIG. 4 was used to develop a half wave rectified pulsating electrical signal to be applied to the plates of each of the three columns. The duty cycle, that is, the portion of the wave form over which the signal is applied to the column, is variable from 0 – 100%. As will be noted from the tables below, in some instances the voltage and duty cycle applied to each column was varied from column to column, since the temperature rise through each column increases the conductivity of the contaminated water thus requiring a lower voltage and duty cycle in each succeeding column. The voltage and amp figures for each columnn are average figures across the plates of the column and the power consumption inn kilowatt hours per 1,000 gallons is the total power consumption of the columns. The three columns employed had a 6-inch inside diameter and a flow height from inlet 50 to outlet 51 of 78 inches. Each column had 28 identical iron plates 52 and 53 spaced 3 inches apart and 5½ inches in diameter. The plates contained ¼ inch diameter perforations set on a ½ inch staggered center totaling about 40% of the area of the plates.

EXAMPLE 1

A contaminated water stream containing 19.2 ppm chromium, 25.0 ppm cadmium, and 22.5 ppm zinc in a solution containing 45.0 ppm $CN^-$ (colormetric titration for free cyanide) and having a conductivity of 2,225 micromhos was adjusted to a pH of 8.0 and fed to the unit at 75°F. The operating conditions for the unit at flow rates of 2, 3, and 4 gallons per minute are shown in Table 1. Treatment of the water by the method and apparatus of the invention at these conditions resulted in the level of contaminant removal shown in Table 2.

Table 1

| | VOLTS D.C. | AMPS D.C. | DUTY CYCLE % | UNIT POWER | |
|---|---|---|---|---|---|
| | Column 1/2/3 | Column 1/2/3 | Column 1/2/3 | KW AC | KW-hr per 1000 gal |
| 2 GPM | 51/32/34 | 72/76/76 | 90/65/50 | 3.48 | 24.22 |
| 3 GPM | 48/32/36 | 70/72/75 | 90/70/55 | 3.22 | 16.18 |
| 4 GPM | 56/42/48 | 68/75/78 | 95/70/55 | 3.07 | 15.73 |

Table 2

PERCENT CONTAMINANT REMOVAL

| Compound | Cr | Cd | Zn | Cn⁻ |
|---|---|---|---|---|
| 2 GPM | 99.94 | 99.92 | 97.55 | 93.33 |
| 3 GPM | 99.94 | 98.00 | 98.22 | 85.78 |
| 4 GPM | 99.92 | 98.00 | 96.88 | 94.67 |

EXAMPLE 2

A contaminated water stream containing 39.6 ppm chromium, 8.2 ppm copper, 10.6 ppm nickel and no cyanide with a conductivity of 2,150 micromhos was adjusted to the pH of 6.7 and fed to the unit at 75°F. The operating conditions for the unit at flow rates of 2.0, 3.0 and 4.0 gallons per minute are shown in Table 3. Treatment of the water by the method and apparatus of the invention at those conditions resulted in the level of contaminant removel shown in Table 4.

Table 3

| | VOLTS D.C. | AMPS D.C. | DUTY CYCLE % | UNIT POWER | |
|---|---|---|---|---|---|
| | Column 1/2/3 | Column 1/2/3 | Column 1/2/3 | KW AC | KW-hr per 1000 gal |
| 2 GPM | 54/55/41 | 70/70/70 | 95/80/70 | 3.37 | 35.95 |
| 3 GPM | 55/34/42 | 70/70/70 | 95/85/75 | 3.57 | 21.22 |
| 4 GPM | 55/38/46 | 68/70/70 | 95/85/80 | 3.37 | 16.92 |

Table 4

PERCENT CONTAMINANT REMOVAL

| Compound | Cr | Cu | Ni |
|---|---|---|---|
| 2 GPM | 99.97 | 99.57 | 98.77 |
| 3 GPM | 97.97 | 99.70 | 99.34 |
| 4 GPM | 99.97 | 99.39 | 98.77 |

It will be noted from the foregoing that the scope of the invention is not limited to any particular combinations of contaminants or methods of pre-treating or post-treating the water before or after the column. The reason is that the method and apparatus of the invention will function as described under a wide variety of conditions. For example, with some nickel-cyanide solutions, it is desirable to pre-treat the water by methods known to the art to convert cyanide to cyanate prior to treating the water with the apparatus and method of the invention.

I claim:

1. A process for electrolytically treating contaminated water containing suspended and dissolved impurities comprising the steps of:

passing the contaminated water vertically upward through an upright column having a water inlet port adjacent the lower end thereof and a water outlet port adjacent the upper end thereof, wherein between the inlet and outlet port, a plurality of electrically conductive perforate plates are disposed in the column in a plane essentially perpendicular to the longitudinal axis thereof and electrically insulated therefrom, the transverse dimensions of the plate approximating those of the column so that essentially all of the contaminated water being passed through the column passes through perforations in the plates;

generating variable pulsating electrical signals of opposite signs; and, supplying a variable pulsating electrical signal of a first sign to individual ones of a first set of the plates while simultaneously supplying a variable pulsating electrical signal of the opposite sign to individual ones of a second, alternating set of the plates to create a pulsating electrical field between the plates.

2. The process of claim 1 wherein water downstream of said column is passed through a flocculation chamber of such capacity that the average residence time of the water therein is at least about 20 minutes.

3. The process of claim 2 wherein water in said chamber is subjected to gentle agitation.

4. The process of claim 3 wherein said water is caused to follow a non-linear path through said chamber, occasioning said agitation.

5. The process of claim 1 comprising the further step of, prior to passing the contaminated water through the column, adjusting the pH of the contaminated water to within a range of from about 8.0 to about 10.0.

6. The process of claim 5 which comprises the further step of removing gross impurities from the contaminated water by passing it through a screen of abut 30 mesh or larger prior to its admission to said column.

7. The process of claim 2 wherein downstream of said chamber water is passed through clarification and filtering means to remove suspended matter therefrom.

8. A process for electrolytically treating contaminated water containing as contaminants organic and inorganic suspended solids, dissolved metal salts, and cyanide complexes of metals comprising the steps of:

pretreating the contaminated water by adjusting its pH to within the range of from about 8.0 to about 10.0 and by screening the contaminated water through a screen of about 30 mesh or larger;

passing the contaminated water vertically upward through an upright column having a water inlet port adjacent the lower end thereof and a water outlet port adjacent the upper end thereof, wherein, between the inlet and outlet port, a plurality of electrically conductive perforate plates are disposed in the column in a plane essentially perpendicular to the longitudinal axis thereof and electrically insulated therefrom, the transverse dimensions of the plates approximating those of the column so that essentially all of the contaminated water passed through the column passes through perforations in said plates;

generating variable pulsating electrical signals of opposite signs with variable pulsating electrical signal means;

applying a variable pulsating electrical signal of a first sign to individual ones of a first set of the plates while simultaneously applying a variable pulsating electrical signal of the opposite sign to individual ones of a second, alternating set of the plates to create a pulsating electrical field between the plates;

passing contaminated water which flows from the outlet port of the column through a flocculation chamber of such capacity that the average residence time of the water therein is at least about 20 minutes; and, subsequently, passing the water through clarification and filtering means to remove suspended solids therefrom.

9. The process of claim 8 wherein the voltage of the pulsating electrical signal is varied so as to maintain a constant current density on the plates of the column.

10. The process of claim 8 which additionally comprises the step of sensing conductivity of said water upstream from said column, generating a signal proportional to said conductivity, and employing said signal to vary input A.C. voltage to means by which said pulsating signal is generated in inverse relation to said conductivity.

11. The process of claim 1, wherein the voltage of the pulsating electrical signals is varied so as to maintain a constant current density on the plates of the column.

12. The process of claim 1, further comprising the step of sensing conductivity of said water upstream from the column, generating a signal proportional to said conductivity, and employing said signal to vary input A.C. voltage to means by which said pulsating signal is generated in inverse relation to said conductivity.

13. The process of claim 1, further including the step of maintaining current density on the perforate plates substantially at a constant by varying the voltage of the pulsating electrical signals.

14. The process of claim 1, wherein the magnitude of said pulsating electrical field is at least about $10^5$ volts/centimeter in the immediate vicinity of said plates.

15. The process of claim 1, wherein said pulsating electrical signals are generated in the form of a square wave.

* * * * *